United States Patent [19]

Heckel

[11] Patent Number: 4,486,857

[45] Date of Patent: Dec. 4, 1984

[54] DISPLAY SYSTEM FOR THE SUPPRESSION AND REGENERATION OF CHARACTERS IN A SERIES OF FIELDS IN A STORED RECORD

[75] Inventor: Paul C. Heckel, Los Altos, Calif.

[73] Assignee: Quickview Partners, Los Altos, Calif.

[21] Appl. No.: 433,141

[22] Filed: Oct. 6, 1982

[51] Int. Cl.$^3$ .................................................. G06F 3/14

[52] U.S. Cl. ...................................... 364/900; 340/723

[58] Field of Search ......................... 364/900 MS File; 340/723

[56] References Cited

U.S. PATENT DOCUMENTS 3,895,375 7/1975 Williams .............................. 340/723

OTHER PUBLICATIONS

Hodge and Pennington, *Some Studies of Word Abbreviation Behavior,* Journal of Experimental Psychology, 1973, vol. 98, 350–361.

Rogers and Moeller, *Comparison of Abbreviation Methods: Measures of Preference and Decoding Performance,* Human Factors, 1984, 44–59.

*Primary Examiner*—Raulfe B. Zache

*Attorney, Agent, or Firm*—Phillips, Moore, Lempio & Finley

[57] ABSTRACT

A microprocessor having a limited display capability is programmed to display a series of data fields from a record in which certain characters are selectively suppressed so that the whole or a selected portion of a record is represented. Upon actuation a selected field will be restored to its full data length for temporary display on the display medium.

21 Claims, 2 Drawing Figures

Microfiche Appendix Included
(1 Microfiche, 18 Pages)

DISPLAY SYSTEM FOR THE SUPPRESSION AND REGENERATION OF CHARACTERS IN A SERIES OF FIELDS IN A STORED RECORD

A microfiche appendix of an exemplary computer program consisting of one microfiche of fifteen frames is incorporated by reference.

DESCRIPTION

Technical Field

This invention relates to microprocessors and in particular, relates to a microprocessor having a minimal display capability and a stored file of records having a length generally in excess of the display element capacity.

BACKGROUND OF THE INVENTION

Hand-held calculators having a nine, ten, or eleven digit display have been in common use for a number of years. Recently, computers or microprocessors having a keyboard of the type found in an ordinary typewriter, and a minimum display capacity, have been marketed. These microprocessors generally have a display capacity of sixteen to eighty characters, and are generally of the size of a pad of paper, that is, 8"×11"×¾" (20.3×28×2 cm). These "tablet size" microprocessors may include provision for a storage medium such as a cassette or the like. This type of microprocessor, in one form, may be used as a word processor, while in other forms it can be used as a small computer capable of storing data files, each comprised of a number of records. An example of one of these microprocessors is available from Hewlett-Packard Company, Palo Alto, Calif. as Model HP-75c. The problem presented to the user of such a microprocessor is that the entire record generally exceeds the display capacity. Thus, the record length may be, for example, eighty or one hundred characters long, and in order to display the entire record, the user must call up segments of the record divisible by the length of the display device. Thus, in the example just given, a record of ninety characters in length would require at least three "looks" to be fully displayed to the user. Therefore, in "leafing through" a file, the user must look at each record, or at least portions of each record, three times.

Quite frequently, the data contained in a particular record may be of little use in one particular "look-up", while at another time that same data would be extremely pertinent. This is particularly true when the user is updating fields in a record.

For example, if a hand-held computer were to be used as an address file, or more particularly, a personnel file, it may be that at one time the user would be desirous of obtaining an individual's phone number, while the next time, the user would be desirous of obtaining the name of the individual's employer. Thus, in the file described above having ninety characters in each record, the user, in the first case, would have no need for information relating to "employer" but would be interested in the employee's name and telephone number. In the second instance, the user would not be interested in the telephone number, but rather would be interested in the employer.

Current data file display programs are generally adaptable through programming for use on fixed cathode ray tubes having a relatively large display capability. Thus, entire records or multiple fields are relatively easily displayed by utilizing two or more lines of the cathode ray tube. Even with a CRT, the user or designer is forced to specify a maximum width for each field type. Generally, the full field width is displayed, leaving blank spaces. In the small hand-held environment, the luxury of large display devices is not available. However, it is still necessary to identify relatively easily each record as it is called up.

It is an object of this invention to provide a capability in a microprocessor to reduce data fields to fit into a limited display area, and selectively to increase the size of a particular data field to utilize extra space that may be available.

It is also a primary object of this invention to display in a series of reduced fields a full-length field along with the data field name that has been selected by the user.

It is a further object of this invention to ensure that the above objects are met even though the underlying fields are of undetermined length.

It is a still further object of this invention to provide to the user a visual image of the record so that the various fields in the record are readily recognizable.

SUMMARY OF THE INVENTION

This invention provides a microprocessor system having an input subsystem and an output subsystem capable of displaying a string of alphanumeric characters of length S. It also would include in the microprocessor a storage subsystem capable of electronically storing strings of alphanumeric characters of predetermined lengths. The microprocessor also includes a processor subsystem. The invention consists of an improved data display system which recognizes certain preselected alphanumeric characters in a string of stored characters, the string having a length greater than n. The system provides for selectively removing recognized preselected alphanumeric characters from the string until the length of the string is equal to S. Finally, the system provides for reinserting the selectively removed recognized alphanumeric characters in at least a substring of length less than S.

DETAILED DESCRIPTION OF THE PREFERRED EMBODIMENT

Figure 1:
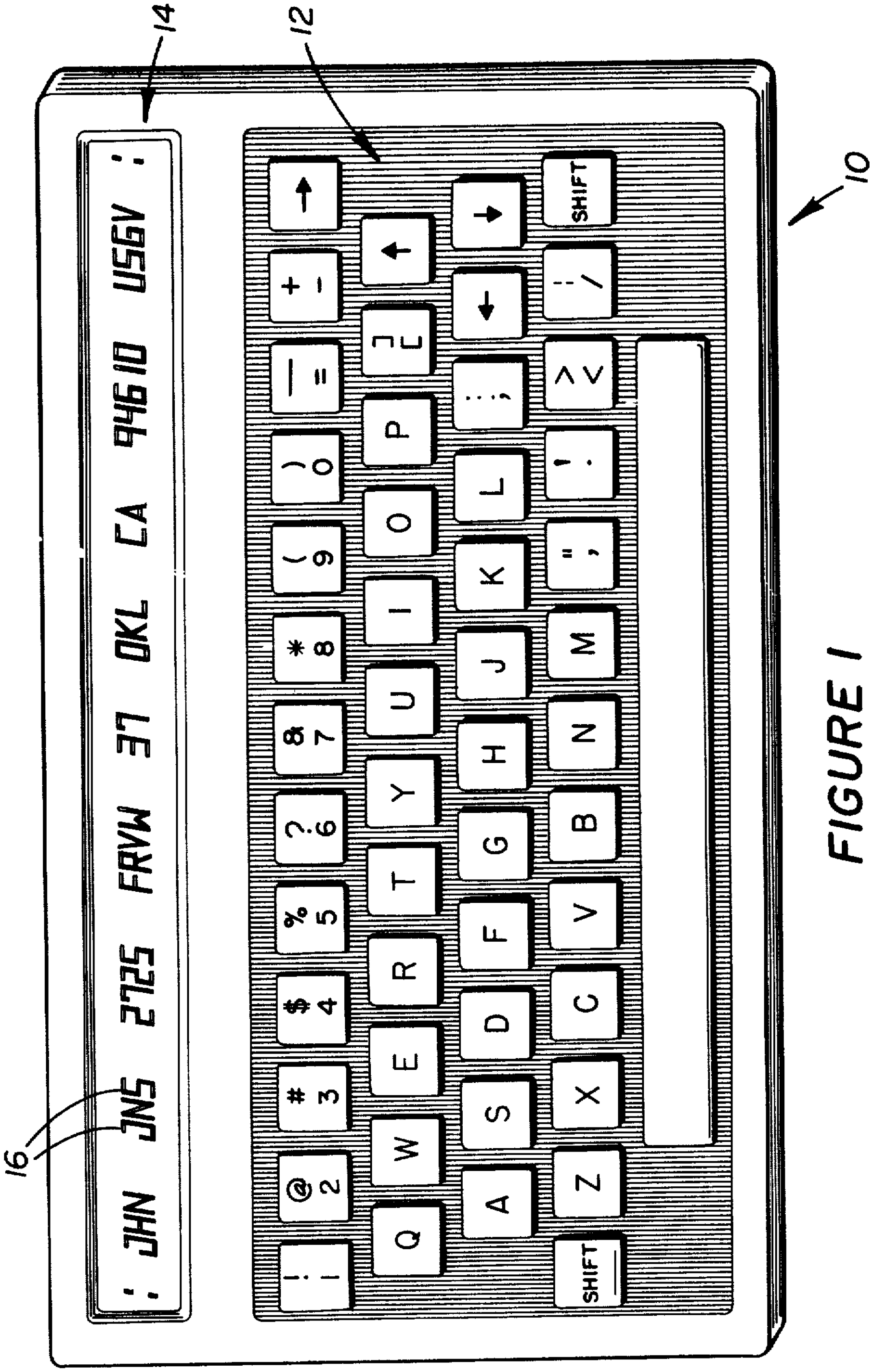
FIG. 1 is a representation of a tablet-size microprocessor/computer which incorporates an embodiment of this invention.

Referring to FIG. 1, a microprocessor/computer 10 is illustrated having a keyboard 12 which includes most of the ASCII character set plus certain command keys pertinent to such a microprocessor. Also included in microprocessor 10 is a display unit 14 which in this instance will display forty characters, usually by liquid crystal display 16 or other display device, more familiarly denoted LCD. Each LCD 16 is capable of displaying any of the ASCII character set found in keyboard 12.

Figure 2:
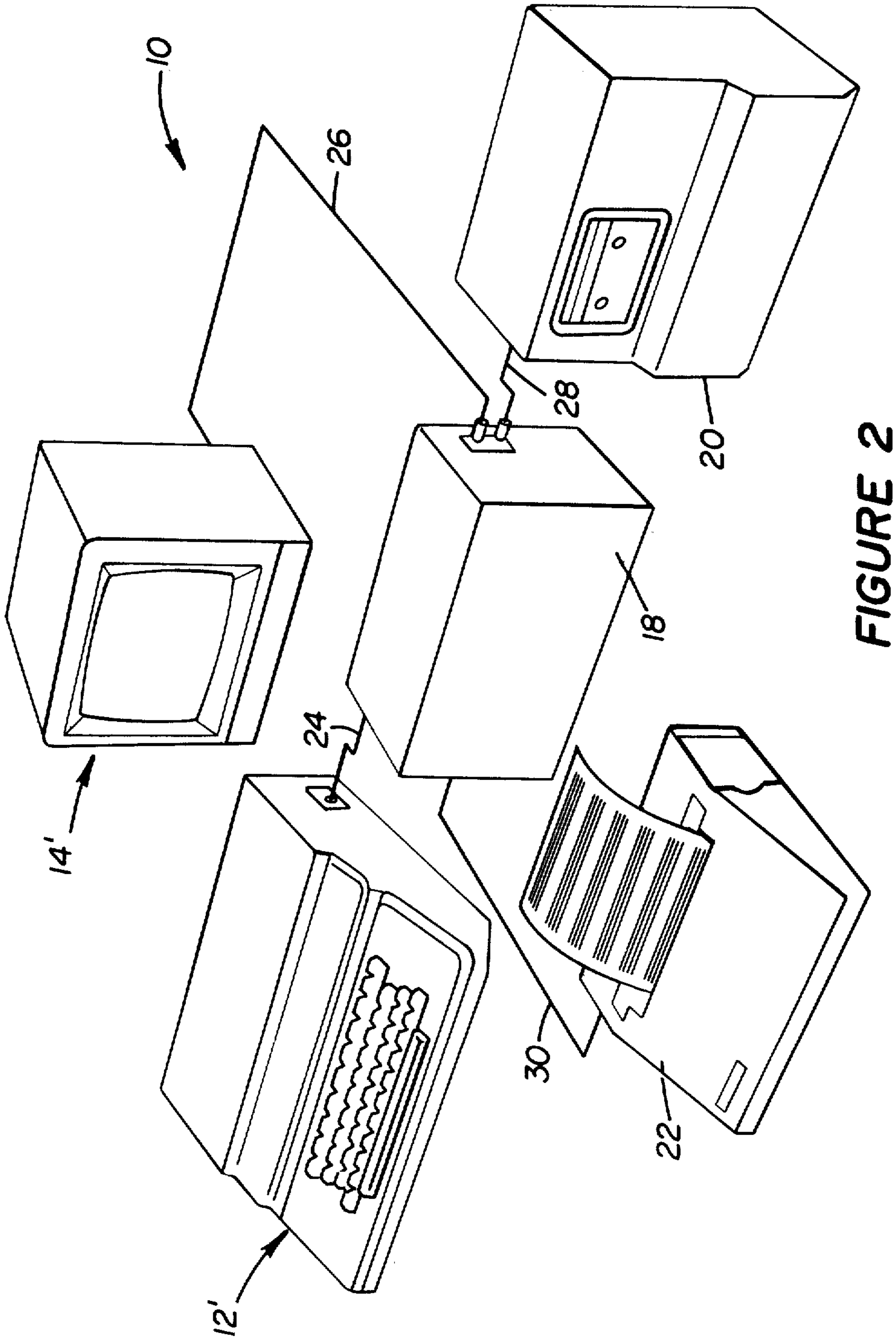
FIG. 2 is a schematic representation of the elements of the microprocessor shown in FIG. 1.

Referring now to FIG. 2, which represents schematically the elements of a microprocessor, microprocessor 10 would include a keyboard 12' and a display unit 14', which in FIG. 2 is illustrated as a CRT. Also included in microprocessor 10 is a processor subsystem 18 which includes internal storage of a limited nature. Microprocessor 10 may also include a cassette tape storage or the like so that information entered into and updated in the storage subsystem may be easily withdrawn for use in a second computer. This cassette storage is represented in FIG. 2 by block 20. Also shown in FIG. 2 is a printer module 22 which ordinarily would not be found in microprocessor 10, although it is not beyond the capability of the art to include a paper tape printout on such a device. It should be noted that in FIG. 2, keyboard 12' which corresponds to keyboard 12 is connected to the processor subsystem by appropriate cabling such as cable 24. Likewise, display device 14' is connected to the processor subsystem by cable 26, while the storage device 20 is connected to the processor by cable 28. Similarly, printer 22 is connected to processor 18 by cable 30. It will be understood by those skilled in the art that input may be accomplished into the system illustrated in FIG. 2 through keyboard 12' or in the microprocessor shown in FIG. 1 through keyboard 12. Output may be achieved through the display device 14 or 14', as the case may be, while storage is accomplished either in the processor subsystem 18 or in the peripheral device or tape drive 20 which would correspond to a cassette drive in microprocessor 10 (not shown). Output could also be accomplished through printer 22, as shown in FIG. 2. Finally, input could also be accomplished through the peripheral device 20 by means of a cassette or the like. Such input could include a file consisting of records of indeterminate length.

For purposes of this invention, it is to be assumed that there exists at least one file comprised of a number of records. Each record is of length R and consists of n fields. Each field is denoted $F_1, F_2 \ldots F_n$. The length of each field is to be understood to be $L_1, L_2 \ldots L_n$. It is to be further understood that each field can be reduced to a minimum size and in any condition less than the full length, the field will be described as $f_1, f_2 \ldots f_n$ while the reduced length will be $l_1, l_2 \ldots l_n$. It will be subsequently noted that in some cases field size need not be reduced. Nevertheless, when referring to the field length when it appears on the display screen, the lower case l will always be used. It is to be further understood that the display size of the microprocessor will have a length equal to S characters. In the particular illustration shown in FIG. 1, S is equal to forty and for purposes of the description herein, S will remain forty. It should be understood that S can be any number, and the ensuing description will assume that the parameters can be changed to adapt to a display size of other than forty with ease.

It is further understood that the fields in each record are ordered, that is, the data relating to a certain parameter in the record will always occur at the same position in the various records included in the file. Should the field be empty, the record will contain appropriate indications to show that the field is empty. The field lengths need not be fixed and preferably are only of sufficient length to store the data or indicate an empty field. Thus, the records in the file are of variable length.

Finally, it should be understood that the record length R need not exceed S, the display size length. However, reduced length records by selective omission of characters and subsequent regeneration of the field by reinsertion of the characters does not occur unless the record length R exceeds the display size S. Finally, the minimum number of characters necessary for display of each field is predetermined. Thus, even though a field may be of a length X in the record, the minimum length for display is something less than X. For example, the field may have twenty characters in the record and the minimum number of characters for the display may be set at six.

The improvement consists of programming means for reducing each field having a length in excess of the predetermined minimum display size for that field so the field may be displayed with a certain degree of intelligence on the display screen. Further, the invention includes means to expand the reduced or shortened field on the display screen by overlaying the expanded field on the screen in place of the ordinarily displayed reduced fields.

Length reduction is accomplished in several possible ways. Examples of two ways are described here. The first is to take the rightmost characters equal to the minimum number of characters, and display only those rightmost characters. This may be appropriate with numeric fields such as addresses, zip codes, and the like. However, it results in lost intelligence in word fields. The second and preferred type of reduction reduces by selectively removing vowels from the data field. This is accomplished as follows: if the data field is less than or equal to the minimum display size, no reduction is necessary. If this is not the case, then the following steps are performed until the length of the reduced field $l_i$ is equal to the minimum display field size, hereinafter sometimes referred to as $DFS_i$. This is accomplished as follows: if there is a vowel in the data field, the rightmost vowel is removed. If there are no vowels, the data field is truncated by removing the righthand characters until the remaining characters are equal to the display field size $DFS_i$. A vowel is defined as one of the characters a, e, i, o, or u that does not come after a space, a comma, a period, or occurs at the beginning of a word. Thus, the word "fairview" may be reduced to a minimum field size of six by removing successively from the right the "e" and the "i", leaving the characters "fairvw." Similarly, the word "fairview" may be reduced to a minimum field size of four by removing all of the vowels, leaving the characters "frvw." It can be seen that "frvw" would be recognizable as "fairview" to one familiar with the data file. Similarly, the word "programmer" would reduce to a six-character data field size by successively removing the "e", the "a", the "o", and finally the rightmost "r" to give "prgrmm". To reduce "programmer" to a four-character data field size, the same steps are followed with the addition of removing the "m"'s, giving a reduced word of "prgr".

As previously noted, the display screen size is given or predetermined. Should the screen provide for two lines of data as opposed to the one illustrated in FIG. 1, then the sum of the reduced field lengths $l_1+l_2+\ldots l_n$ should be equal to or less than twice the screen width. Furthermore, since each field should be separated by a space, the display width s should be equal to or greater than $l_1+l_2+\ldots l_n+n-1$ for a single line display (n is equal to the number of fields). This may be described as each line of data is equal to the sum of the lengths of the individual field in their reduced state plus one blank space per field less one to separate each field. This formula is useful in determining the minimum field size in the truncated state.

Given a file of several records, with each record containing n fields, the records are displayed as follows. It may be possible that the field size of each record is equal to or less than the allocated minimum display field size or, more likely, certain fields in the record may be less than the display field size and thus the extra space available in the display field may permit expansion of fields that exceed the minimum display field size so that more intelligence may be contained on the display screen than if all the fields in the record were reduced to the minimum display field size as defined above.

In order to determine when this situation occurs, it is necessary to find out how much free space is available. Thus, if DFS(i) (Display Field Size) is equal to the minimum data field size and L(i) is equal to the length of the full size field F(i), the difference between these two can then be denoted as XTRA. Then:

$$XTRA(i) = DFS(i) - L(i) \text{ when } DFS(i) - L(i) > 0 \text{ else } XTRA(i) = 0 \quad (1)$$

If:

$$\sum_{i=1}^{n} XTRA(i) = X \quad (2)$$

and X is greater than zero, then the extra space X can be distributed in one of several ways. For each field, $F_i$ where L(i) is greater than DFS(i), then DFS(i) can be incremented by one simultaneously decrementing X. This process may be iterated until X is equal to zero, at which time there is no more space available. It should be noted that this process will add characters to DFS(i), and after a character is added to DFS(i), i is incremented to i+1. Thus, extra space is distributed relatively evenly over the range of display data fields.

Other methods of distribution of extra space could also be used, such as distributing the space to the fields in proportion to the amount of extra space it would take to display all of that field's data. Alternatively, the field specification could be used to decide how to distribute extra space. In the preferred embodiment, the characters are distributed evenly to all fields which can use extra space equally as long as they can use extra space and as long as extra space is available.

It may be possible in formula 1 that DFS(i)−L(i) is always greater than zero. Thus, there exists extra space that cannot be distributed among all the non-reduced data fields, since no fields have been reduced. As previously stated, the sum of L(i) plus the number of fields minus one is less than or equal to the display width. If there remains extra space, one could leave extra blanks on the right of the display screen. However, for a more aesthetic display, the extra blanks may be distributed between the fields on approximately an even basis. This may be accomplished by the following formula where n equals the number of fields and z equals the number of extra blanks:

$$z = \sum_{i=1}^{n} DFS(i) - L(i) \quad (3)$$

Then, by dividing z by n−1 as shown in the following formula:

$$\frac{z}{n-1} = \text{Integer} + \text{Remainder} \quad (4)$$

One obtains the integer result of the division plus a remainder. For example, if one has ten fields and twenty-one extra blanks, there would be 10−1 or nine separations between the fields. Then 21/9 is equal to the integer value 2 plus a remainder of 3. This means that 2*6+3*3 is equal to twenty-one. That is, to six of the seperating spaces one would add two additional blanks, and to the remaining three separating spaces, one would add three additional blanks.

The system encompasses a scheme for reinserting intelligence into a reduced field at the user's command. Assuming the display is of a record in an address file that shows in FIG. 1 and as in Table 1:

TABLE 1

| Character | 5 | 10 | 15 | 20 | 25 | 30 | 35 | 40 |
|---|---|---|---|---|---|---|---|---|
| Display | :Jhn Jns 2725 Frvw 37 Okl CA 94610 USGv: | | | | | | | |
| Field | 1 | 2 | 3 | 4 | 5 | 6 | 7 | 8 |

(It should be noted that an address file is used only as a vehicle to explain the invention which is a data display system. The inventive data display system has been used in at least one other application, namely, as a public utility meter reading display system).

Reference should then be made to Table 2, which follows, for an explanation of the data fields:

TABLE 2

| | (field) |
|---|---|
| <NAME=John Jones> | 1 |
| <HOUSE NUMBER=2725> | 2 |
| <STREET=Fairview> | 3 |
| <APT NO=37> | 4 |
| <CITY=Oakland> | 5 |
| <STATE=CA> | 6 |
| <ZIP CODE=94610> | 7 |
| <EMPLOYER=USGovernment> | 8 |

The user may wish to determine the full contents of, for example, field 1, which in Table 1 reads JHN JNS. The processor system will then determine how to overlay for display the full field of Table 2 which corresponds to field 1 in the reduced state as shown in Table 1. As shown in Table 2, the full field includes <NAME=John Jones>. Since this field is the first and occurs at the left of the display screen, the processor will retrieve from the data file the full textual information "John Jones" and insert before that field the descriptive phrase NAME= and replace that on the leftmost portion of the display screen as shown in Table 3.

TABLE 3

| Character | 5 | 10 | 15 | 20 | 25 | 30 | 35 | 40 |
|---|---|---|---|---|---|---|---|---|
| | :<NAME=John Jones> 37 Okl CA 94610 USGv: | | | | | | | |

It should be noted that fields 2 and 3 are overlaid, while fields 4 through 8 remain in their reduced state.

Should the user select a field in the middle, such as field 3, which reads Frvw in Table 1, the center position of the reduced field is first found. In the example shown, this occurs at position 16 on the display screen. The width of the full field with its legend, as shown in Table 2, is found to be equal to seventeen characters. Thus, the starting position taken from position 16 of the display screen would be 17/2 or nine positions to the right of character 16. Referring to Table 4, it can be seen that the expanded field reaches into field 1 and thus field 1 is overlaid, as are fields 2, 4, and 5. The final display is as shown in Table 4:

TABLE 4

| 5 | 10 | 15 | 20 | 25 | 30 | 35 | 40 |
|---|---|---|---|---|---|---|---|
| :<STREET=Fairview> CA 94610 USGv: | | | | | | | |

It should be noted that the expanded display will overlay fields rather than characters, as overlaying of characters alone could result in confusion.

Should the field be greater than the display screen size, that is, greater than forty characters as shown in Table 1, the field is displayed starting in positions 1 with the brackets on the screen and extending the full length of the screen. Thus, the rightmost characters are not displayed. The field is reduced as follows: initially the first vowel (as defined above) starting from the left side is deleted as long as it is not one of the rightmost ten characters which in this description are considered important. It should be understood that the ten characters are arbitrary, and may be changed, for example, to five or increased to fifteen. If the data field, after the first vowel removal, is reduced to the point where it is equal to the screen size, then reduction is complete. Else the display is left on the screen briefly for the user to recognize it, then reduction continued. The second reduction step would take out the next leftmost vowel. However, if there are no vowels to delete (all the vowels are in the rightmost characters or there are no remaining vowels), then the initial character of the string to be displayed, that is, the leftmost character, is deleted. One would continue to drop the leftmost characters until the data field reaches the display screen size. It should be noted that the entire data field has been displayed successively on the screen as the left characters, either lead characters or vowels, are deleted individually from the data field. Each successive reduction may be accomplished by a clock circuit or on command of the user.

APPLICABILITY

This microprocessor system is applicable to numerous data files wherein a limited display size is available. It has been found particularly useful in an address file or a meter reading situation. In the meter reading situation, each record would contain, for example, the house number; the street; the apartment number; the customer name; the account number; the route number; the meter type; the meter number; the location of the meter on the house; whether a hazard exists; if a key was required and the key number; any special instructions; and any notes. It would also contain the condition of the meter and then provide spaces for the entry of data consisting of the meter reading. For example, the meter reader could enter the current reading or indicate that the meter had been skipped because of certain reasons. Provision could also be made to change or modify certain other fields.

The microprocessor would then be carried by the meter reader so that he would be cued to the next meter by the program and be able to make the appropriate entry at each stop as he proceeds over his route. Upon completion of the route, the data which had been recorded on magnetic tape or the like, could be inserted into a larger computer for computation of the bill for the appropriate utility.

In the address situation utilized as a description vehicle in the description of the preferred embodiment, the same scenario would take place. However, addresses could be changed, as could the employer. The data fields described in the description of the preferred embodiment could also include such things as telephone numbers, age, marital status, and the like.

Well-known aspects of data processing can be incorporated with this reduction or suppression scheme so that certain data fields may be queried either in their reduced or expanded state as the files are scrolled through the microprocessor. These capabilities are well within the skill of a competent computer specialist and will not be further described here. However, such applications are to be understood to be included with the scope of this invention.

Other aspects, objects, and advantages of this invention can be obtained from a study of the drawings, the description and the appended claims.

I claim:

1. In a microprocessor system having an input subsystem, an output subsystem capable of displaying a string of alphanumeric characters of length S, and a storage subsystem capable of storing strings of alphanumeric characters, each made up of no more than n substrings $F_i$ of alphanumeric characters each of length $L_i$, and a processor subsystem, an improved data display system comprising:
   - means for recognizing certain preselected alphanumeric characters in each substring $F_i$;
   - means for selectively removing the recognized preselected characters in each substring $F_i$ so that the length $L_i$ of $F_i$ is reduced to a shortened substring $f_i$ of predetermined length $l_i$ less than $L_i$ and then displaying the reduced-length substrings $f_i$; and
   - means for displaying a full-length substring $F_i$ selectively chosen from one of the displayed reduced fields $f_i$.

2. The improvement of claim 1 wherein the means for recognizing certain preselected characters includes computer programming to recognize the vowel characters a, e, i, o, and u.

3. The improvement of claim 2 wherein the means for selectively removing preselected characters includes computer programming to remove the rightmost vowel character unless that vowel character occurs after a space, a comma, or a period.

4. The improvement of claim 2 wherein the means for removing preselected characters includes programming means for successively removing vowel characters from the substring $F_i$ except vowel characters occurring after a space, a comma, or a period, starting with the rightmost vowel characters and continuing until $L_i$ is reduced to $l_i$ or until no more eligible vowel characters exist in the partially reduced substring $F_i$.

5. The improvement of claim 4 wherein the programming means further includes means for successively removing the rightmost characters of the partially reduced length substring $F_i$ until $L_i$ is reduced to $l_i$.

6. The improvement of claim 1 wherein the means for displaying a full-length substring $F_i$ includes means to suppress the display of the reduced substring $f_i$ and at least the adjacent reduced substrings $f_i-1$ and $f_i+1$ when i is greater than one and less than S.

7. The improvement of claim 1 wherein the means for displaying the full-length substring $F_1$ includes means to suppress the display of the reduced substring $f_1$ and at least the reduced substring $f_2$.

8. The improvement of claim 1 wherein the means for displaying the full-length substring $F_n$ includes means to suppress the reduced substring $f_n$ and at least the reduced substring $f_{n-1}$.

9. The improvement of claim 6 wherein the means for displaying a full-length substring $F_i$ when $L_i$ is greater than S includes programming means to successively remove predetermined characters from $F_i$ one at a time over a predetermined time while displaying the remaining S leftmost characters of $F_i$.

10. The improvement of claim 9 wherein the predetermined characters are initially selected from the vowel characters a, e, i, o, and u where the vowel characters occur other than after a space, a comma, or a period.

11. A programming system for a microprocessor having an input subsystem, an output subsystem capable of displaying a string of alphanumeric characters of length S, and a storage subsystem capable of storing strings of alphanumeric characters, each made up of no more than n substrings $F_i$ of alphanumeric characters each of length $L_i$, and a processor subsystem, comprising:

means for recognizing certain preselected alphanumeric characters in each substring $F_i$;

means for selectively removing the recognized preselected characters in each substring $F_i$ so that the length $L_i$ of $F_i$ is reduced to a shortened substring $f_i$ of predetermined length $l_i$ less than $L_i$ and then displaying the reduced-length substrings $f_i$; and means for displaying a full-length substring $F_i$ selectively chosen from one of the displayed reduced fields $f_i$.

12. The program of claim 11 wherein the means for recognizing certain preselected characters includes computer programming to recognize the vowel characters a, e, i, o, and u.

13. The program of claim 12 wherein the means for selectively removing preselected characters includes computer programming to remove the rightmost vowel character unless that vowel character occurs after a space, a comma, or a period.

14. The program of claim 12 wherein the means for removing preselected characters includes programming means for successively removing vowel characters from the substring $F_i$ except vowel characters occurring after a space, a comma, or a period starting with the rightmost vowel character and continuing until $L_i$ is reduced to $l_i$ or until no more eligible vowel characters exist in the partially reduced substring $F_i$.

15. The program of claim 14 wherein the programming means further includes means for successively removing the rightmost characters of the partially reduced length substring until $L_i$ is reduced to $l_i$.

16. The program of claim 11 wherein the means for displaying a full-length substring $F_i$ includes means to suppress the display of the reduced substring $f_i$ and at least the adjacent reduced substrings $f_i-1$ and $f_i+1$ when i is greater than one and less than S.

17. The program of claim 11 wherein the means for displaying the full-length substring $F_1$ includes means to suppress the display of the reduced substring $f_1$ and at least the reduced substring $f_2$.

18. The program of claim 11 wherein the means for displaying the full-length substring $F_n$ includes means to suppress the reduced substring $f_n$ and at least the reduced substring $f_{n-1}$.

19. The program of claim 16 wherein the means for displaying a full-length substring $F_i$ when $L_i$ is greater than S includes programming means to successively remove predetermined characters from $F_i$ one at a time over a predetermined time while displaying the remaining S leftmost characters of $F_i$.

20. The program of claim 19 wherein the predetermined characters are initially selected from the vowel where the vowel characters occur other than after a space, a comma, or a period.

21. A computer program for operating on a file consisting of a plurality of records where each record consists of n ordered fields $F_i$ where n is greater than one and wherein each field $F_i$ consists of $L_i$ alphanumeric characters, the program operable on a computer having a display capability for S alphanumeric characters, where S is less than the length of the record, the program comprising:

means for recognizing certain preselected alphanumeric characters in each field $F_i$;

means for selectively removing the recognized preselected characters in each field $F_i$ so that the length $L_i$ of $F_i$ is reduced to a shortened substring $f_i$ of predetermined length $l_i$ less than $L_i$ and then displaying the reduced length substrings $f_i$ on the computer; and means for displaying a full-length substring $F_i$ selectively chosen from one of the displayed reduced fields $f_i$ while simultaneously displaying at least one other reduced field $f_i$ or $f_n$.

* * * * *

UNITED STATES PATENT AND TRADEMARK OFFICE
CERTIFICATE OF CORRECTION

PATENT NO. : 4,486,857

DATED : December 4, 1984

INVENTOR(S) : PAUL C. HECKEL

It is certified that error appears in the above-identified patent and that said Letters Patent is hereby corrected as shown below:

Claim 6 should read as follows:

The improvement of claim 1 wherein the means for displaying a full-length substring $F_i$ includes means to suppress the display of the reduced substring $f_i$ and at least the adjacent reduced substrings $f_{i-1}$ and $f_{i+1}$ when i is greater that one and less than S.

Claim 16 should read as follows:

The program of claim 11 wherein the means for displaying a full-length substring $F_i$ includes means to suppress the display of the reduced substring $f_i$ and at least the adjacent reduced substrings $f_{i-1}$ and $f_{i+1}$ when i is greater than one and less than S.

Signed and Sealed this

*Eleventh* Day of *June 1985*

[SEAL]

*Attest:*

DONALD J. QUIGG

*Attesting Officer* *Acting Commissioner of Patents and Trademarks*

US004486857B1

REEXAMINATION CERTIFICATE (2099th)

United States Patent [19]   [11] B1 4,486,857

Heckel   [45] Certificate Issued Oct. 12, 1993

[54] DISPLAY SYSTEM FOR THE SUPPRESSION AND REGENERATION OF CHARACTERS IN A SERIES OF FIELDS IN A STORED RECORD

[75] Inventor: Paul C. Heckel, Los Altos, Calif.

[73] Assignee: Quickview Partners, Los Altos, Calif.

Reexamination Request:
No. 90/002,127, Sep. 10, 1990

Reexamination Certificate for:

| | |
|---|---|
| Patent No.: | **4,486,857** |
| Issued: | **Oct. 6, 1982** |
| Appl. No.: | **433,141** |
| Filed: | **Dec. 4, 1984** |

Certificate of Correction issued Jun. 11, 1985.

[51] Int. Cl.[5] .............................................. G06F 3/14
[52] U.S. Cl. ............................ 395/100; 364/DIG. 1; 364/DIG. 2; 395/600
[58] Field of Search .................... 382/47, 56; 340/723, 340/731, 700–722; 341/87; 364/200 MS File, 900 MS File, 715.01, 427, 715.02, 710.01, 710.08, 710.09, 710.1, DIG. 1 MS File, DIG. 2 MS File; 379/100; 358/400, 261.1, 261.2, 261.3; 400/61, 62, 63, 64, 65–76; 395/600, 100, DIG. 1 MS File, DIG. 2 MS File, 800

[56] References Cited

U.S. PATENT DOCUMENTS 4,396,992 8/1983 Hayashi et al. .................... 364/900
4,463,386 7/1984 Goddard et al. .................. 358/261

OTHER PUBLICATIONS

Heus "Hyphenation Algorithm for Romance Languages" IBM Tech. Dis. Bulletin, vol. 22, No. 5 (Oct. 79) pp. 1785–1786).

Todd "Abbreviated Typing for Word Processing," IBM Tech. Dis. Bulletin, vol. 21, No. 9, (Feb. 79), pp. 3796–3797.

Howell et al. "Message Compression with Human--Readable Abbreviations.", IBM Tech. Bulletin, vol. 25, No. 2 (Jul. 1982) pp. 678–682).

*DP Master* personal computer program manual copyrighted 1980 by Barney Stone and Alpine Software, published by Stoneware. pp. 11–21, 58–63.

Visicalc Est. 1978 a conventional spread sheet program. pp. 1-1 through 1-7, 2-8 through 2-12 and 3-2 throught 3-4.

*Primary Examiner*—Robert B. Harrell

[57] ABSTRACT

A microprocessor having a limited display capability is programmed to display a series of data fields from a record in which certain characters are selectively suppressed so that the whole or a selected portion of a record is represented. Upon actuation a selected field will be restored to its full data length for temporary display on the medium.

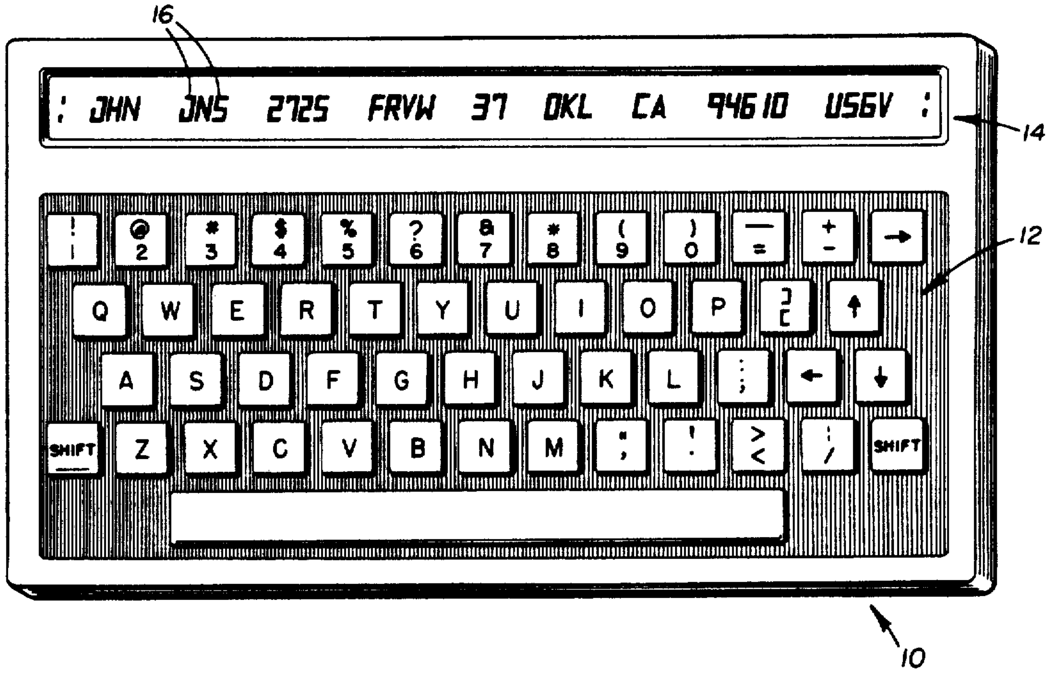

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 11, and 21 are determined to be patentable as amended.

Claims 2–10 and 12–20, dependent on an amended claim, are determined to be patentable.

New claims 22–42 are added and determined to be patentable.

1. In a microprocessor system having an input subsystem[,] *and* an output subsystem [capable of] *for* displaying a string of alphanumeric characters of length S, and a storage subsystem capable of storing strings of alphanumeric characters, each made up of no more than n substrings $F_i$ of alphanumeric characters each of length $L_i$, *where n is less than S, and each substring* $F_i$ *has a display size* $D_i$ *less than S,* and a processor subsystem, an improved data display system comprising:

means for recognizing certain preselected alphanumeric characters in each substring $F_i$, means for selectively removing *at least some of* the recognized preselected characters in each substring $F_i$ so that the length $L_i$ of $F_i$ is reduced to a shortened substring $f_i$ of [predetermined] length $l_i$ less than $L_1$ *where the sum of all said lengths* $l_i$ *is less than or equal to S and at least one such substring* $F_j$ *has length* $l_j$ *less than* $L_j$ *and the length* $l_j$ *is not equal to* $D_j$, and then *simultaneously* displaying the reduced-length [substrings] *substring* $f_i$ *on said output subsystem*, and means for displaying a full-length substring $F_i$ selectively chosen from one of the displayed reduced [fields] *substrings* $f_i$.

11. A programming system for a microprocessor having an input subsystem, an output subsystem capable of displaying a string of alphanumeric characters of length S, and a storage subsystem capable of storing strings of alphanumeric characters, each made up of no more than n substrings $F_i$ of alphanumeric characters each of length $L_i$, *where n is less than S, and each substring* $F_j$ *has a display size* $D_j$ *less than S,* and a processor subsystem, comprising:

means for recognizing certain preselected alphanumeric characters in each substring $F_i$, means for selectively removing *at least some of* the recognized preselected characters in each substring $F_i$ so that the length $L_i$ of $F_i$ is reduced to a shortened substring $f_i$ of [predetermined] length $l_i$ less than $L_i$ *where the sum of all said lengths* $l_i$ *is less than or equal to S and at least one such substring* $F_j$ *has length* $l_j$ *less than* $L_j$ *and the length* $l_j$ *is not equal to* $D_j$, and then *simultaneously* displaying the reduced-length [substrings] *substring* $f_i$ *on said output subsystem*, and means for displaying a full-length substring $F_i$ selectively chosen from one of the displayed reduced [fields] *substrings* $f_i$.

21. A computer program for operating on a file consisting of a plurality of records where each record consists of n ordered fields $F_i$ where n is greater than one and wherein each field $F_i$ consists of $L_i$ alphanumeric characters, the program operable on a computer having a display capability for S alphanumeric characters, where S is less than the length of the record, *and where n is less than S, and further wherein each field* $F_j$ *has a display size* $D_j$ *less than S,* the program comprising:

means for recognizing certain preselected alphanumeric characters in each field $F_i$, means for selectively removing *at least some of* the recognized preselected characters in each field $F_i$ so that the length $L_i$ of $F_i$ is reduced to a shortened substring $f_i$ of predetermined length $l_i$ less than $L_i$, *where the sum of all said lengths* $l_i$ *is less than or equal to S and at least one such field* $F_j$ *has length* $l_j$ *less than* $L_j$ *and the length* $l_j$ *is not equal to* $D_j$, and then displaying *simultaneously* the reduced length substrings $f_i$ on the computer; and means for displaying a full-length [substring] *field* $F_i$ selectively chosen from one of the displayed reduced [fields] *substrings* $f_i$ while simultaneously displaying at least one other reduced [field $f_i$] *substring* $f_j$ or $f_n$.

*22. The system of claim 1 wherein the character removal and first display means includes sizing means for determining the display field size for each reduced substring* $f_i$.

*23. The system of claim 22 wherein said sizing means includes means for selectively allocating extra space to field* $f_i$ *when*

$$\sum_{i=1}^{n} l_i < S.$$

*24. The system of claim 23 wherein the sizing means further includes means for allocating extra space in proportion to the size determined by the sizing means before the extra space is determined.*

*25. In a microprocessor system having an input subsystem and an output subsystem for displaying a string of alphanumeric characters in a display area of length S, and a storage subsystem for storing strings of alphanumeric characters, each string made up of no more than n substrings* $F_i$ *of alphanumeric characters each of length* $L_i$, *and a processor subsystem, an improved data display system comprising:*

*recognition means for recognizing certain preselected alphanumeric characters in each substring* $F_i$;

*character removal and first display means for selectively removing at least some of the recognized preselected characters in each substring* $F_i$, *so that the length* $L_i$ *of* $F_i$ *is reduced to a shortened substring* $f_i$ *of predetermined length* $l_i$ *less than* $L_i$ *and then displaying the reduced length substrings* $f_i$ *and;*

*second display means for selectively choosing one of the displayed reduced-length substrings* $f_i$ *and displaying the corresponding full length substring* $F_i$ *by overlaying at least one of the displayed reduced-length substrings* $f_i$ *without expansion of the remaining displayed reduced substrings.*

*26. The system of claim 25 wherein the character removal and first display means includes sizing means for*

*determining the display field size for each reduced substring $f_i$.*

*27. The system of claim 26 wherein said sizing means includes means for selectively allocating extra space to the display field size for substring $f_i$ when*

$$\sum_{i=1}^{n} l_i < S,$$

*28. The system of claim 25 wherein the output subsystem substring display area S may be divided into no more than n substring display areas, each substring display area having a preselected length of $s_i$ alphanumeric characters and wherein the character removal and first display means further includes sizing means for determining the display field size for each substring $f_i$, such that*

$$\sum_{i=1}^{n} l_i \leq S$$

*and such that where $l_i$ is less than $s_i$, the extra character spaces may be assigned to other reduced substrings.*

*29. The system of claim 28 wherein the sizing means assigns display field sizes $s_i$ in proportion to the length $L_i$ of the full length substrings.*

*30. The system of claim 27 wherein the sizing means further includes means for allocating extra space in proportion to the size determined by the sizing means before the extra space is determined.*

*31. In a microprocessor system having an input subsystem, an output subsystem which includes a certain display area for displaying a string of alphanumeric characters of length S, and a storage subsystem for storing strings of alphanumeric characters, each made up of no more than n substrings $F_i$ of alphanumeric characters each of length $L_i$, and a processor subsystem, an improved data display system comprising:*

*means for recognizing certain preselected alphanumeric characters in each substring $F_i$,*

*default mode display means for selectively removing the recognized preselected characters in each substring $F_i$ so that the length $L_i$ is reduced to a shortened substring $f_i$ of predetermined length $l_i$* less than $L_i$ *and then displaying each of the reduced-length substrings $f_i$ in a corresponding field display area $s_i$ within certain display area, wherein the substrings $f_i$ that can be displayed is limited by the number of characters S capable of being displayed in said certain display area and the predetermined lengths $l_i$ of said reduced-length substrings $f_i$, whereby the visual image that a single string is displayed in said display area is achieved by displaying parts of all its substrings within said display area, and*

*full length display means for overlaying at least one of said areas $s_i$ so that a full substring $F_i$, selectively chosen from one of the displayed reduced substrings $f_i$, may be displayed thereupon.*

*32. The system of claim 31 wherein said full length display means includes means for expanding the field display area $s_i$ for the chosen reduced substring $f_i$.*

*33. The system of claim 32 further wherein said full length display means includes means for returning the display to said default mode whereby all field display areas $s_i$ are restored to their original reduced sizes $s_i$.*

*34. The system of claim 32 further including means for simultaneously displaying one or more other reduced substrings $f_i$ while the full length substring $F_i$ is being displayed.*

*35. The system of claim 31 further wherein said full length display means includes means for overlaying and suppressing the display of one or more adjacent reduced substrings, while simultaneously displaying at least one reduced substring $f_l$ or $f_n$ and intermediate reduced substrings which are not overlaid or suppressed by the expanded reduced substring.*

*36. The system of claim 32 further wherein said full length display includes means for scrolling said chosen full length substring $F_i$ through said expanded field display area.*

*37. The system of claim 31 further wherein said preselected alphanumeric characters are truncated from either or both ends.*

*38. The system of claim 31 further wherein at least one said reduced length substring $f_i$ consists of the leftmost characters of its substring $F_i$.*

*39. The system of claim 31 wherein said default mode display means includes means for automatically sizing each said field display area $s_i$.*

*40. The system of claim 39 wherein said means for automatically sizing includes means for allocating extra space to each field display area for a substring $f_i$ in response to its predetermined length $l_i$.*

*41. The system of claim 39 further wherein said means for automatically sizing includes means for:*

*a) identifying which full length substrings $F_i$ are shorter or longer in lenth than a predetermined minimum field display area for a shortened substring $f_i$;*

*b) shortening the predetermined minimum field display area for full length substrings identified as shorter in length than the predetermined minimum field display area to free extra display space to be allocated to other fields; and*

*c) lengthening the field display area $s_i$ for one or more substrings $F_i$ identified as longer in length than the predetermined minimum field display area by allocating said extra display space thereto.*

*42. The system of claim 40 further wherein said means for sizing includes means for allocating said extra display space to said substrings $f_i$ identified as longer in response to the full length $L_i$ whereby each field has the same percentage of its characters displayed.*

* * * * *